March 16, 1954     A. F. PFINGSTEN     2,672,097

TRACTOR DRIVEN HIGH-PRESSURE PUMP

Filed Oct. 14, 1949

INVENTOR.
August F. Pfingsten
BY
Sam J. Slotsky
ATTORNEY

Patented Mar. 16, 1954

2,672,097

UNITED STATES PATENT OFFICE 2,672,097

TRACTOR DRIVEN HIGH-PRESSURE PUMP

August F. Pfingsten, Rock Rapids, Iowa

Application October 14, 1949, Serial No. 121,261

1 Claim. (Cl. 103—87)

My invention relates to a pumping arrangement to be operated by a tractor rear power take-off shaft.

An object of my invention is to provide a high pressure pump which can be readily attached to the rear take-off shaft of the tractor, and which requires no extra supports for supporting the pump, the pump being efficiently supported from the shaft itself, as well as being operated thereby.

A further object of my invention is to provide a quickly attachable means attached to the pump itself, whereby the pump can be held against rotation so that the pump element itself will function as required.

A further object of my invention is to provide a very simple structure.

Figure 1:
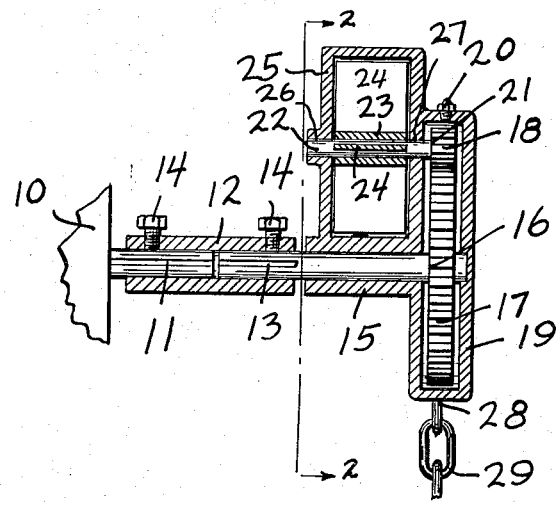
Figure 2:
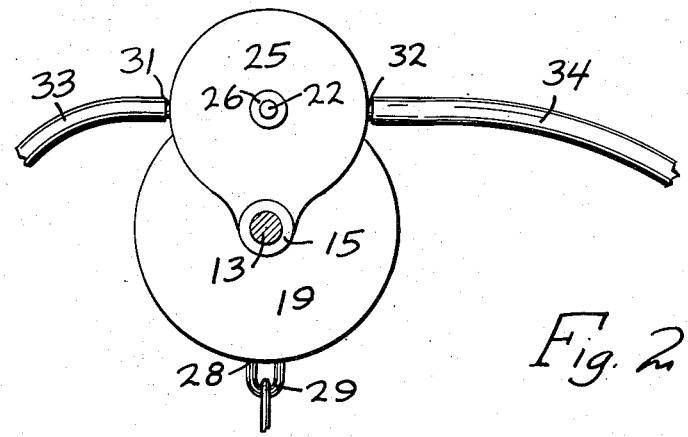
Figure 3:
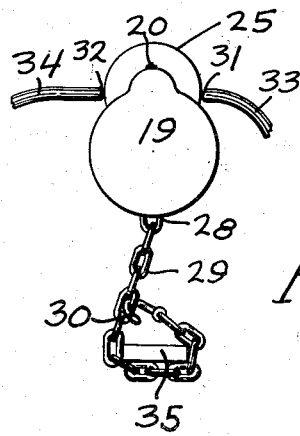

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional detail taken substantially along the longitudinal axis of the shaft portions of the device, Figure 2 is a sectional view taken along the lines 2—2 of Figure 1, and Figure 3 is a rear elevational view showing the device with the rotation locking arrangement being attached to a tractor draw-bar.

My invention contemplates the provision of a simple high speed pump which will operate at a high pressure, which can be very quickly attached to the tractor shaft in cases of emergency or otherwise, and which need not be bolted or otherwise secured, and to provide a simple arrangement which will prevent rotation of the casing of the device so that the pump will operate efficiently and at a high pressure for any desired purpose.

I have used the character 10 to designate a tractor transmission casing portion, the character 11 indicating the rear power take-off spline shaft.

I have used the character 12 to indicate a substantially strong cylindrical coupling adapted to fairly snugly engage the shaft 11, which coupling member also includes spline portions to further engage a further shaft 13.

The character 14 designates a pair of lock screws threadably engaged with the member 12 and to thereby securely lock the coupling to the shafts 11 and 13.

The shaft 13 extends into a journalling portion 15 and is attached at 16 to a large gear 17, which large gear 17 is adapted to engage a much smaller gear 18, the gears 17 and 18 operating within the casing portion 19 having the grease inlet member 20. The small gear 18 is secured at 21 to a further smaller shaft 22 having the hub 23 to which hub are attached the pump member blades 24, rotating within the further casing portion 25. The shaft 22 is suitably journalled at the portions 26 and 27, and the casing 25 merges with the journalling portion 15 as shown in Figures 1 and 2.

Attached to the casing 19 at 28 is a lengthened chain 29 terminating in a hook 30 (see Figure 3).

Communicating with the pump casing 25 is an inlet opening 31 and an outlet opening 32 to which are attached the flexible hoses 33 and 34.

The device is operated in the following manner. The unit is attached to the shaft 11 by means of the coupling 12, by simply placing the coupling over both shafts 11 and 13 and then tightening the machine screws 14. Next, the chain 29 is wrapped around any fixed portion of the tractor desired, Figure 3 showing the chain being wrapped around the draw-bar 35, and the hook 30 is then inserted in any one of the links of the chain, the chain being drawn fairly tightly to leave as little slack as possible.

The tractor is then started, which causes the power take-off shaft to thereby rotate the shaft 13, which correspondingly rotates the large gear 17 which in turn turns the smaller gear 18 at a very high speed, which causes the pump shaft to operate, thereby providing a high pressure pump. The chain device securely holds the entire casing against rotation, so that the rotative effect is thereby imparted to the pump, which will operate at its maximum efficiency, the chain 29 being made of any length desired, and the operator can also attach it in any way, whichever is most convenient, etc.

The flexible pipe 33 can be inserted in a well when it is desired to pump water for emergencies or otherwise, or can be inserted in a field spraying solution, with the pipe 34 being used to spray, and it will be understood that the device can be used for a variety of purposes.

It will be noted that the structure provides an arrangement wherein the pump is quickly attached for use without the attendant disadvantages of separate brackets and the like, and includes a variety of other advantages readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tractor driven pump comprising a casing, a shaft, a coupling member for attaching said shaft to a tractor take-off shaft, means for securing said casing against rotation, including a flexible securing member attached to said casing and to a fixed portion of a tractor, said shaft extending into said casing, a journalling portion in which said shaft is journalled included in said casing, a larger gear to which said shaft is attached, a smaller gear meshing with said larger gear, a rotatable pump member including a further shaft attached to said smaller gear for thereby driving said pump member, said casing enclosing said gears, means for firmly securing said coupling member to said shaft and said take-off shaft, said pump member including inlet and outlet pipes attached thereto.

AUGUST F. PFINGSTEN.

References Cited in the file of this patent

UNITED STATES PATENTS

| Number | Name | Date |
|---|---|---|
| 1,054,762 | Goeth | Mar. 4, 1913 |
| 1,538,881 | Barton | May 26, 1925 |
| 1,663,253 | Hillborn | Mar. 20, 1928 |
| 1,903,210 | Carrier | Mar. 28, 1933 |
| 2,265,971 | Paul | Dec. 9, 1941 |
| 2,274,763 | Yates | Mar. 3, 1942 |
| 2,299,879 | Court | Oct. 27, 1942 |
| 2,413,775 | Neighbour | Jan. 7, 1947 |